UNITED STATES PATENT OFFICE.

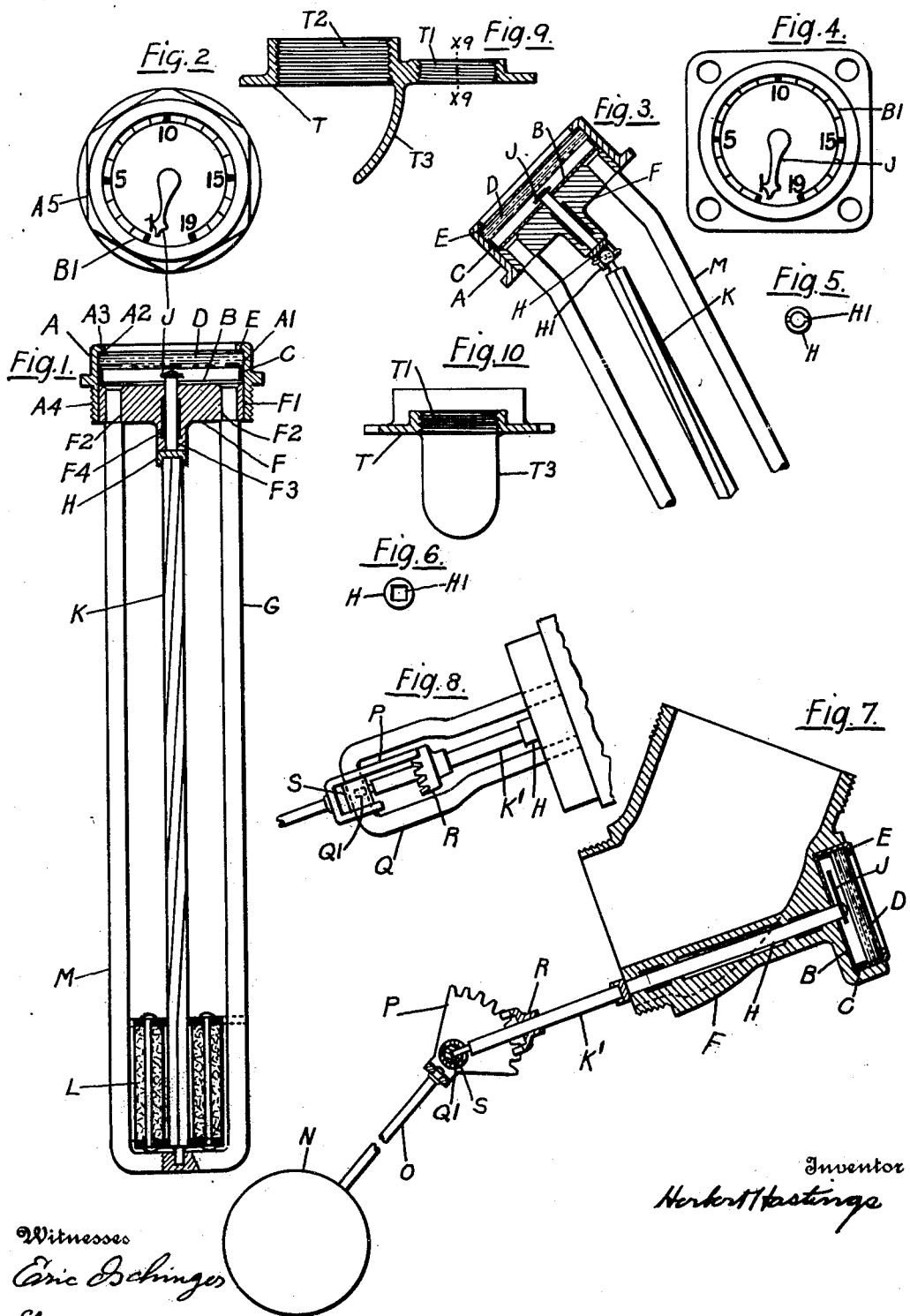

HERBERT HASTINGS, OF BRIGHTON, NEW YORK, ASSIGNOR TO ROCHESTER MANUFACTURING CO., INC. OF ROCHESTER, NEW YORK, A CORPORATION OF NEW YORK.

FLUID-GAGE.

1,272,436.  Specification of Letters Patent.  Patented July 16, 1918.

Application filed March 20, 1915. Serial No. 15,936.

*To all whom it may concern:*

Be it known that I, HERBERT HASTINGS, a citizen of the United States, residing at Brighton, in the county of Monroe and State of New York, have invented certain new and useful Improvements in Fluid-Gages, of which the following is a specification.

My invention relates particularly to gages for indicating the amount of gasolene in tanks as used on automobiles, but obviously may be used for other liquids and in other uses; and the objects of my invention are, First to provide such an instrument of simple and compact form and with parts adapted to rapid and economical manufacture.

Second, to provide means of preventing, without adding friction that would tend to destroy the sensitive rotation of the stem, the gasolene from reaching the indicator dial by leakage along the indicator stem between the stem and its bearing.

Third, to provide flexible means between the portion of the stem, within the body of the gage and the portion extending into the tank, so that said portions may be disposed at an angle one to the other without affecting the sensitive operation of either.

Fourth, to provide a flange or fitting for attaching a gage to a tank or other fluid receptacle adapted to serve also as the filler opening of the tank.

In illustrating my present invention in one form I have indicated the type of float, float guide and revolving member disclosed in my previous application for which Letters Patent No. 1,126,997 were granted to me under date of February 2, 1915.

The above objects may be attained in many different arrangements and combination of parts. I have chosen to illustrate it by the accompanying drawings, in which—

Figure 1 is a partial sectional view in elevation of a gage embodying portions of my improvements.

Fig. 2 is a plan view of the gage shown in Fig. 1.

Fig. 3 is a broken elevational view partly in section, of a gage of the same general type as shown in Fig. 1, but showing a different angular relation of the revolving parts and another method of attaching to a tank.

Fig. 4 is a plan view of the dial face or head of the gage of Fig. 3.

Fig. 5 is a transverse view looking at the lower end of the indicator stem of Fig. 3.

Fig. 6 is a transverse view looking at the lower end of the indicator stem of Fig. 1.

Fig. 7 is a partial sectional view in elevation of a gage combined with a tank filler fitting and embodying another form of mechanism for actuating the indicator stem.

Fig. 8 is a plan view, partially broken away, of the actuating mechanism of Fig. 8.

Fig. 9 is a plan view in section of a filler flange provided with means for attaching the gage of Fig. 1 to a tank.

Fig. 10 is a transverse plan view partially in section taken on the line $x^9$—$x^9$ of Fig. 9 looking to the left.

Like letters refer to like parts throughout the different views.

A is the gage head or cap and is pierced concentrically with a hole of two diameters. The larger diameter $A^1$ is adapted to receive the dial plate B, the spacing ring C, which may be a separate ring or formed with the dial, the glass crystal D, the gasket E and the body F. The opening of the smaller diameter $A^2$ provides the opening through which the indications of the gage are visible and the shoulder $A^3$ formed by the change in diameter between $A^1$ and $A^2$ provides a surface against which the gasket E is compressed, forming a sealed joint when the body is forced into position sufficiently far to exert the required pressure between these parts.

The body F is adapted to be forced either into the head A as in Figs. 1 and 3 firmly enough to secure the parts in position when thus assembled, or over the head, as in Fig. 7, in which figure a specially shaped body is shown which provides a filler opening for the tank.

The head A may be provided with screw threads $A^4$ for attaching to the fluid receptacle and the head further provided with a portion for receiving a wrench as at $A^5$, or the head may be provided with a bolt and flange connecting means as in Figs. 2 and 3.

The body F is provided with side apertures $F^2$ into which the ends of the support G are secured, and is also provided with a central aperture in which the indicator stem H is free to rotate. This central aperture is enlarged near its central portion as at $F^4$, Figs. 1 and 3, to provide a space for packing the stem to prevent the fluid, in which the gage may be immersed, from passing between the stem and its bearing and reaching the dial. This same provision could be made by recessing the stem instead of the body. As a packing material I use a liquid of high specific gravity and unaffected by the fluid in which the gage is to be used; mercury in many cases I use in this space which, because of its high specific gravity, will hold back such fluids as the gage is designed to be used in, and further, because of its fluidity, its effect upon the sensitiveness of the stem to rotation is negligible. In Fig. 7 I show two of such packing spaces, one near each end of the stem and between these a similar third space; in the two end spaces I use mercury and in the central space a lighter fluid that is unaffected by the fluid in which the gage is to be used.

The indicator stem H has fixed to its upper end an indicator J, one end of which, as the stem rotates, traverses the scale B¹ on the dial B, indicating the amount of fluid in the tank and the lower end of said stem is shaped as at H¹ in Figs 5 and 6 to receive the end of the revolving shaft K and to transmit the revolving motion of K to the stem H. A further object in this construction of making the indicator stem and revolving member separate parts, but interlocking, is to enable the axes of these two parts to be at an angle one to the other without cramping or impairing the sensitive operation of the parts and to this end the parts are made to fit freely one with the other.

The float L, support M and revolving member K, in Figs. 1 and 2, are similar to those disclosed in my previous invention.

In Figs. 7 and 8 I show another form of support and means for actuating the revolving member K¹. The float N is fixed to one end of the suspension rod O and the other end of said rod is fixed to the oscillating toothed segment P which is free to oscillate about the cross bar portion of the U shaped support Q, and this cross bar is further provided with a bearing recess Q¹ in which one end of the revolving member K¹ is adapted to pivot and the other end of the member K¹ is received in the end of the indicator stem as and for the purpose stated with respect to Figs. 1 and 3. Upon the revolving shaft K¹ of these figures is fixed a toothed wheel R which is adapted to engage the teeth of the segment P and as the float N is caused to rise or fall, the teeth of this segment engaging the teeth of the wheel R causes the latter, and the shaft to which it is fixed, to oscillate proportionally and this shaft in turn oscillates the indicator stem H as in the previous figures. To maintain the toothed segment in its central position I have provided a collar S on the cross bar of the support Q and the two cheeks of the tooth sector, as shown, span this collar and the sector is thus held from axial displacement.

As an improved means of attaching the gage to a tank I show in Fig. 9 a double flanged collar T provided with a gage seat T¹, which in this case is shown to receive a gage provided for attaching as is the gage of Fig. 1, and also provided with a filler opening T² and between the filler and gage opening and projecting below the lower face of the flange I show a protecting vane or partition T³ for protecting the gage against being damaged through carelessness in inserting a filling funnel or other nozzle or means for filling the tank.

Having thus described my invention what I claim as new and desire to secure by Letters Patent is—

1. In a fluid gage in combination a head provided internally with a cylindrical bore with a flange at one end and externally with a threaded portion at one end and a polygonal portion at the other end, a body adapted to be retained by said head, a dial, a crystal and a gasket all adapted to be compressed between said body and shoulder, a support for a float fixed to said body, an indicator stem journaled within said body, a float and means controlled by the float for oscillating the indicator stem proportional to the rise and fall of the float.

2. In a fluid gage in combination a head provided with a bored portion and a crystal retaining flange and provided externally with a threaded portion and a polygonal portion, a body, a crystal and a dial compressed between said flange and body, means mounted upon said body for guiding a float, a float, a revoluble member actuated by the float and an indicator actuated by the revoluble member.

3. In a fluid gage the combination of a body, a head, a graduated dial and a crystal retained between said body and head, an indicator stem journaled in said body and provided with indicating means, said body and stem being shaped to provide a recess therebetween at spaced distances from each end of the indicator bearings, a fluid packing substance retained within said recess, a float, a guide for said float, an oscillating member adapted to be turned by said float and means for communicating the motion of the oscillating member to the indicator stem.

4. In a fluid gage the combination of a body, a U-shaped, one piece float guide attached to the body, a float slidable on said guide, an oscillating member, means for converting the sliding motion of the float into oscillating motion of the member, an indicator stem journaled in said body and provided with means for engaging the oscillating member to move in unison therewith, an indicator carried thereon, and a graduated dial adapted to be traversed by the indicator.

5. In a fluid gage in combination a body provided with a cylindrical perforation, a cylindrical stem journaled therein, a recess provided to surround the stem at spaced distances from each end thereof, packing fluid retained in said recess, and means for oscillating the stem.

In testimony whereof I affix my signature in presence of two witnesses.

HERBERT HASTINGS.

Witnesses:
ELEANOR M. CORCORAN,
EDNA K. BOOTH.